US012629805B2

(12) United States Patent
Pomeroy et al.

(10) Patent No.: US 12,629,805 B2
(45) Date of Patent: May 19, 2026

(54) POWERED FASTENER DRIVER

(71) Applicant: TECHTRONIC CORDLESS GP, Anderson, SC (US)

(72) Inventors: Edward A. Pomeroy, Piedmont, SC (US); Elton L. Watson, Greenville, SC (US); Justin Clack, Oak Grove, LA (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/530,135

(22) Filed: Dec. 5, 2023

(65) Prior Publication Data

US 2024/0100671 A1 Mar. 28, 2024

Related U.S. Application Data

(63) Continuation of application No. 17/863,942, filed on Jul. 13, 2022, now Pat. No. 11,850,714.

(Continued)

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .. B25C 1/06; B25C 1/047; B25C 1/04; B25C 1/008; B25C 1/041
See application file for complete search history.

(56) References Cited

U.S. PATENT DOCUMENTS 317,212 A 5/1885 Rubin
942,163 A 12/1909 Berner
(Continued)

FOREIGN PATENT DOCUMENTS

CN 1798954 A 7/2006
CN 101389449 A 3/2009
(Continued)

OTHER PUBLICATIONS

Snap-On, "18 Gauge 2" Brad Nailer," Model #870015 Instruction Manual, © 2007 (14 pages).
(Continued)

*Primary Examiner* — Veronica Martin
(74) *Attorney, Agent, or Firm* — Michael Best & Friedrich LLP

(57) ABSTRACT

A powered fastener driver includes a first cylinder, a first piston positioned within the first cylinder, a second cylinder in fluid communication with the first cylinder, and a second piston positioned within the second cylinder. The second piston is moveable between a top-dead-center position and a bottom-dead-center position to initiate a fastener driving cycle. A drive blade is coupled to the second piston for movement therewith and a drive mechanism is configured to drive the first piston between the top-dead-center position and at or near the bottom-dead-center position. The drive mechanism includes a crank arm configured to rotate less than 360 degrees in a first direction to complete a first fastener driving cycle and less than 360 degrees in an opposite, second direction to complete a subsequent second fastener driving cycle.

20 Claims, 11 Drawing Sheets

Related U.S. Application Data

(60) Provisional application No. 63/222,639, filed on Jul. 16, 2021.

(56) References Cited

U.S. PATENT DOCUMENTS

| | | | |
|---|---|---|---|
| 1,072,358 | A | 9/1913 | Palmros |
| 1,072,367 | A | 9/1913 | Sibley |
| 1,829,609 | A | 10/1931 | Robinson |
| 3,035,268 | A | 5/1962 | Goldring |
| 3,150,488 | A | 9/1964 | Haley |
| 3,288,339 | A | 11/1966 | Bade |
| 3,567,098 | A | 3/1971 | Maynard |
| 3,568,780 | A | 3/1971 | Matsuo |
| 3,754,396 | A | 8/1973 | Erma |
| 3,847,321 | A | 11/1974 | Charlez |
| 3,878,902 | A | 4/1975 | Matsuo |
| 4,192,389 | A | 3/1980 | Raman |
| 4,380,313 | A | 4/1983 | Klaus et al. |
| 4,415,110 | A | 11/1983 | Hunter |
| 4,913,331 | A | 4/1990 | Utsumi et al. |
| 5,111,890 | A | 5/1992 | Ranger et al. |
| 5,720,423 | A | 2/1998 | Kondo et al. |
| 6,158,643 | A | 12/2000 | Phillips |
| 6,231,319 | B1 | 5/2001 | Iida et al. |
| 6,484,814 | B2 | 11/2002 | Bongers-Ambrosius |
| 6,604,666 | B1 | 8/2003 | Pedicini et al. |
| 6,672,498 | B2 | 1/2004 | White et al. |
| 6,705,503 | B1 | 3/2004 | Pedicini et al. |
| 6,732,815 | B2 | 5/2004 | Hanke et al. |
| 6,766,935 | B2 | 7/2004 | Pedicini et al. |
| 6,874,452 | B2 | 4/2005 | Adams |
| 6,971,567 | B1 | 12/2005 | Cannaliato et al. |
| 7,032,683 | B2 | 4/2006 | Hetcher et al. |
| 7,225,959 | B2 | 6/2007 | Patton et al. |
| 7,325,711 | B2 | 2/2008 | Schiestl et al. |
| 7,494,035 | B2 | 2/2009 | Weaver et al. |
| 7,594,599 | B2 | 9/2009 | Webb |
| 7,793,811 | B1 | 9/2010 | Pedicini et al. |
| 7,980,440 | B2 | 7/2011 | Hahn et al. |
| 7,984,708 | B2 | 7/2011 | Pedicini et al. |
| 8,079,504 | B1 | 12/2011 | Pedicini et al. |
| 8,091,751 | B2 | 1/2012 | Tanaka |
| RE44,001 | E | 2/2013 | Pedicini et al. |
| 8,523,035 | B2 | 9/2013 | Pedicini et al. |
| 8,550,321 | B2 | 10/2013 | Webb |
| 8,561,869 | B2 | 10/2013 | Towfighi |
| 8,733,610 | B2 | 5/2014 | Pedicini |
| 8,770,457 | B2 | 7/2014 | Hamilton |
| 8,800,834 | B2 | 8/2014 | Pedicini et al. |
| 8,857,692 | B2 | 10/2014 | Shima et al. |
| 8,875,969 | B2 | 11/2014 | Pedicini et al. |
| 8,939,341 | B2 | 1/2015 | Pedicini et al. |
| 9,050,712 | B2 | 6/2015 | Campbell |
| 9,555,530 | B2 | 1/2017 | Pedicini et al. |
| 9,662,777 | B2 | 5/2017 | Pomeroy et al. |
| 9,770,818 | B2 | 9/2017 | Largo |
| 9,782,882 | B2 | 10/2017 | Wolf et al. |
| 9,827,659 | B2 | 11/2017 | Matsuno |
| 9,844,865 | B2 | 12/2017 | Furuta et al. |
| 9,943,952 | B2 | 4/2018 | Kato |
| 9,969,070 | B2 | 5/2018 | Campbell |
| 10,058,985 | B2 | 8/2018 | Raggl et al. |
| 10,076,830 | B2 | 9/2018 | Raggl et al. |
| 10,131,047 | B2 | 11/2018 | Yanagihara et al. |
| 10,201,892 | B2 | 2/2019 | Bruggmueller et al. |
| 10,259,110 | B2 | 4/2019 | Bruggmueller et al. |
| 10,272,553 | B2 | 4/2019 | Yang et al. |
| 10,286,534 | B2 | 5/2019 | Kato |
| 10,343,271 | B2 | 7/2019 | Campbell |
| 10,471,579 | B2 | 11/2019 | Zhang |
| 10,525,577 | B2 | 1/2020 | Masatoshi et al. |
| 10,730,172 | B2 | 8/2020 | Po |
| 10,843,318 | B2 | 11/2020 | Kobori et al. |
| 11,413,734 | B2 | 8/2022 | Bradley et al. |
| 2004/0134961 | A1 | 7/2004 | Wolf et al. |
| 2004/0232194 | A1 | 11/2004 | Pedicini et al. |
| 2006/0180631 | A1 | 8/2006 | Pedicini et al. |
| 2007/0181629 | A1 | 8/2007 | Chen et al. |
| 2008/0054043 | A1 | 3/2008 | Beales |
| 2008/0078799 | A1 | 4/2008 | Wen |
| 2008/0217372 | A1 | 9/2008 | Webb |
| 2008/0314952 | A1 | 12/2008 | Tamura et al. |
| 2008/0314953 | A1 | 12/2008 | Moeller et al. |
| 2009/0090759 | A1 | 4/2009 | Leimbach et al. |
| 2010/0072248 | A1 | 3/2010 | Lai et al. |
| 2011/0180581 | A1 | 7/2011 | Liang et al. |
| 2012/0085226 | A1 | 4/2012 | Thiele et al. |
| 2013/0336809 | A1 | 12/2013 | Antoun et al. |
| 2014/0299646 | A1 | 10/2014 | Webb |
| 2015/0053736 | A1 | 2/2015 | Pomeroy et al. |
| 2015/0122868 | A1 | 5/2015 | Campbell |
| 2015/0129630 | A1* | 5/2015 | Matsuno ................... B25C 1/04 227/130 |
| 2015/0158160 | A1* | 6/2015 | Kato ......................... B25C 1/06 91/55 |
| 2016/0144497 | A1 | 5/2016 | Boehm et al. |
| 2017/0001291 | A1 | 1/2017 | Schnell et al. |
| 2017/0043463 | A1 | 2/2017 | Schnell et al. |
| 2017/0361442 | A1 | 12/2017 | Fairbanks et al. |
| 2017/0361443 | A1 | 12/2017 | Sareault et al. |
| 2018/0009097 | A1 | 1/2018 | Cheatham et al. |
| 2018/0147709 | A1 | 5/2018 | Masatoshi et al. |
| 2018/0207777 | A1 | 7/2018 | Cheatham et al. |
| 2018/0222028 | A1* | 8/2018 | Zhang ....................... B25C 1/06 |
| 2018/0243891 | A1 | 8/2018 | Dittrich et al. |
| 2018/0370003 | A1 | 12/2018 | Schmidt |
| 2018/0370006 | A1 | 12/2018 | Dittrich et al. |
| 2019/0001474 | A1 | 1/2019 | Schmidt et al. |
| 2019/0143498 | A1 | 5/2019 | Weber et al. |
| 2019/0202042 | A1 | 7/2019 | Wu et al. |
| 2019/0283225 | A1 | 9/2019 | Zhao et al. |
| 2020/0061786 | A1* | 2/2020 | Zhang ..................... B25C 1/047 |
| 2020/0189081 | A1 | 6/2020 | Yang et al. |
| 2020/0238494 | A1 | 7/2020 | Li et al. |
| 2020/0282534 | A1 | 9/2020 | Po |
| 2022/0009067 | A1 | 1/2022 | Knight et al. |

FOREIGN PATENT DOCUMENTS

| | | | |
|---|---|---|---|
| CN | 102477973 | A | 5/2012 |
| CN | 204736190 | U | 11/2015 |
| CN | 206263884 | U | 6/2017 |
| CN | 107914242 | A | 4/2018 |
| CN | 207629980 | U | 7/2018 |
| CN | 108527255 | A | 9/2018 |
| CN | 109623736 | A | 4/2019 |
| CN | 209648625 | U | 11/2019 |
| CN | 110900524 | A | 3/2020 |
| CN | 210550947 | U | 5/2020 |
| CN | 112677109 | A | 4/2021 |
| CN | 112828827 | A | 5/2021 |
| DE | 1503164 | A1 | 3/1970 |
| DE | 3728454 | A1 | 3/1989 |
| EP | 1349711 | B1 | 2/2009 |
| FR | 1414089 | A | 10/1965 |
| GB | 1044288 | A | 9/1966 |
| JP | H0747270 | B2 | 5/1995 |
| JP | 2010059917 | A | 3/2010 |
| TW | 570864 | B | 1/2004 |
| WO | 02087831 | A2 | 11/2002 |
| WO | 2011010511 | A1 | 1/2011 |
| WO | 2011010512 | A1 | 1/2011 |
| WO | 2011010634 | A1 | 1/2011 |
| WO | 2012061295 | A1 | 5/2012 |
| WO | 2013161909 | A1 | 10/2013 |
| WO | 2013168719 | A1 | 11/2013 |
| WO | 2014061807 | A1 | 4/2014 |
| WO | 2014073669 | A1 | 5/2014 |
| WO | 2014084221 | A1 | 6/2014 |
| WO | 2014084222 | A1 | 6/2014 |
| WO | 2014087934 | A1 | 6/2014 |

(56) References Cited

FOREIGN PATENT DOCUMENTS

| | | | |
|---|---|---|---|
| WO | 2017015654 | A1 | 1/2017 |
| WO | 2018128765 | A1 | 7/2018 |

OTHER PUBLICATIONS

Compliance Poster Company, “Nail Gun Use & Safety,” © 1998 (1 page).
Oregon OSHA, “Pneumatic Nail and Staple Gun Safety,” Hazard Alert, © 2009 (2 pages).
Paslode, “Pneumatic Tools,” Operating and Maintenance Manual, © 2007 (32 pages).
Partial European Search Report for Application No. 22185034.0 dated Dec. 1, 2022 (12 pages).
Extended European Search Report for Application No. 22185034.0 dated Mar. 30, 2023 (12 pages).

* cited by examiner

POWERED FASTENER DRIVER

CROSS-REFERENCE TO RELATED APPLICATIONS

This application is a continuation of U.S. patent application Ser. No. 17/863,942 filed on Jul. 13, 2022, which claims priority to U.S. Provisional Patent Application No. 63/222,639 filed on Jul. 16, 2021, the entire contents of all of which are incorporated herein by reference.

FIELD OF THE DISCLOSURE

The present disclosure relates to power tools, and more particularly to powered fastener drivers.

BACKGROUND OF THE DISCLOSURE

There are various fastener drivers used to drive fasteners (e.g., nails, tacks, staples, etc.) into a workpiece known in the art. These fastener drivers operate utilizing various energy sources (e.g., compressed air generated by an air compressor, electrical energy, flywheel mechanisms) known in the art, but often these designs are met with power, size, and cost constraints.

SUMMARY OF THE DISCLOSURE

The disclosure provides, in one aspect, a powered fastener driver including a first cylinder, a first piston positioned within the first cylinder, the first piston being moveable between a top-dead-center position and at or near a bottom-dead-center position, a second cylinder in fluid communication with the first cylinder, a second piston positioned within the second cylinder, the second piston being moveable between a top-dead-center position and a bottom-dead-center position to initiate a fastener driving cycle, a drive blade coupled to the second piston for movement therewith, and a drive mechanism configured to drive the first piston between the top-dead-center position and at or near the bottom-dead-center position. The drive mechanism including a crank arm configured to rotate less than 360 degrees in a first direction to move the first piston from at or near the bottom-dead-center position and the top-dead-center position and then back to at or near the bottom-dead-center position to complete a first fastener driving cycle, and less than 360 degrees in an opposite, second direction to move the first piston from at or near the bottom-dead-center position and the top-dead-center position and then back to at or near the bottom-dead-center position to complete a subsequent second fastener driving cycle.

The disclosure provides, in another aspect, a powered fastener driver including a first cylinder, a first piston positioned within the first cylinder, the first piston being moveable between a top-dead-center position and at or near a bottom-dead-center position, a second cylinder in fluid communication with the first cylinder, a second piston positioned within the second cylinder, the second piston being moveable between a top-dead-center position and a bottom-dead-center position to initiate a fastener driving cycle, a drive blade coupled to the second piston for movement therewith, and a drive mechanism configured to drive the first piston between the top-dead-center position and at or near the bottom-dead-center position. The drive mechanism including a crank arm configured to rotate in a first direction to complete a first fastener driving cycle and an opposite, second direction to complete a subsequent second fastener driving cycle.

The disclosure provides, in another aspect, a powered fastener driver including a first cylinder, a first piston positioned within the first cylinder, the first piston being moveable between a top-dead-center position and at or near a bottom-dead-center position, a second cylinder in fluid communication with the first cylinder, a second piston positioned within the second cylinder, the second piston being moveable between a top-dead-center position and a bottom-dead-center position to initiate a fastener driving cycle, a drive blade coupled to the second piston for movement therewith, and a drive mechanism configured to drive the first piston between the top-dead-center position and at or near the bottom-dead-center position. The drive mechanism including a crank arm configured to rotate less than 360 degrees in alternating directions to complete consecutive fastener driving cycles.

The disclosure provides, in another aspect, a method for controlling a motor of a power tool. The method comprising electrically braking, by a controller, the motor at a first time, and applying a pulse-width modulated (PWM) signal to the motor, by the controller, at a second time. The second time is determined by determining, by the controller, a type of a battery pack electrically coupled to the power tool, and determining, by the controller, the second time based on the type of the battery pack.

The disclosure provides, in another aspect, a method for controlling a motor of a powered fastener driver. The method comprising load testing a battery pack of the powered fastener driver by driving a crank arm against a fixed stop coupled to a housing of the powered fastener driver, determining, by a controller, an internal resistance of the battery pack by measuring one or both of a voltage and a current of the battery pack while driving the crank arm against the fixed stop, and determining, by the controller, a type of battery pack based on the determined internal resistance.

Other aspects of the disclosure will become apparent by consideration of the detailed description and accompanying drawings.

Before any embodiments of the disclosure are explained in detail, it is to be understood that the present subject matter is not limited in its application to the details of construction and the arrangement of components set forth in the following description or illustrated in the following drawings. The present subject matter is capable of other embodiments and of being practiced or of being carried out in various ways.

DETAILED DESCRIPTION

Figure 1:
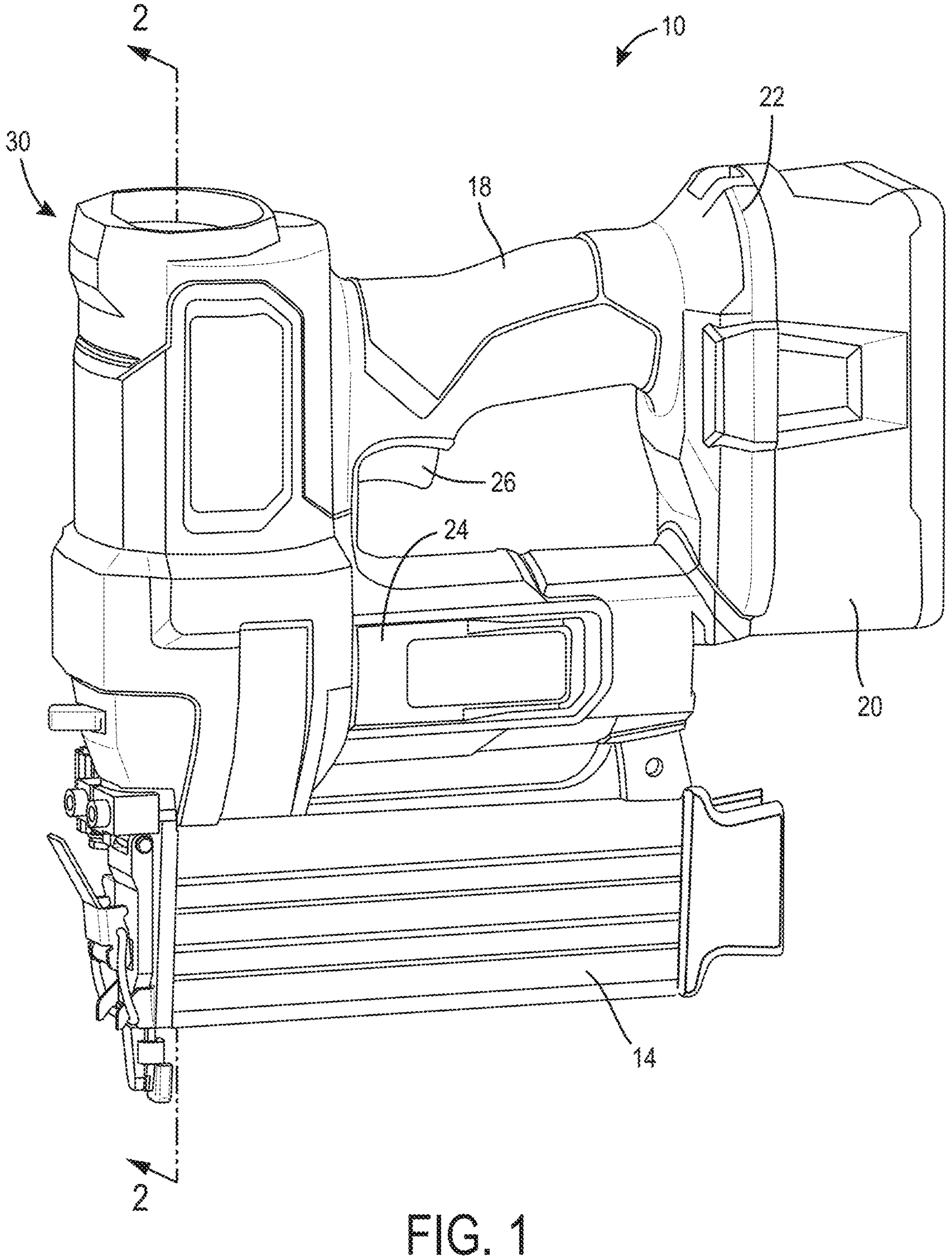
FIG. 1 is a perspective view of a powered fastener driver in accordance with an embodiment of the disclosure.

With reference to FIG. 1, a powered fastener driver 10 is operable to drive fasteners (e.g., nails, tacks, staples, etc.) held within a magazine 14 into a workpiece. The powered fastener driver 10 includes an outer housing with a handle portion 18, a structural housing 24, and a user-actuated trigger 26 mounted on the handle portion 18. Notably, the powered fastener driver 10 does not require an external source of air pressure, but rather the powered fastener driver 10 includes an on-board air compressor 30. In this way, the weight and/or size of tool may be reduced. The on-board air compressor 30 is powered by a power source (e.g., a battery pack 20), coupled to a battery attachment portion 22 of the outer housing.

Figure 2:
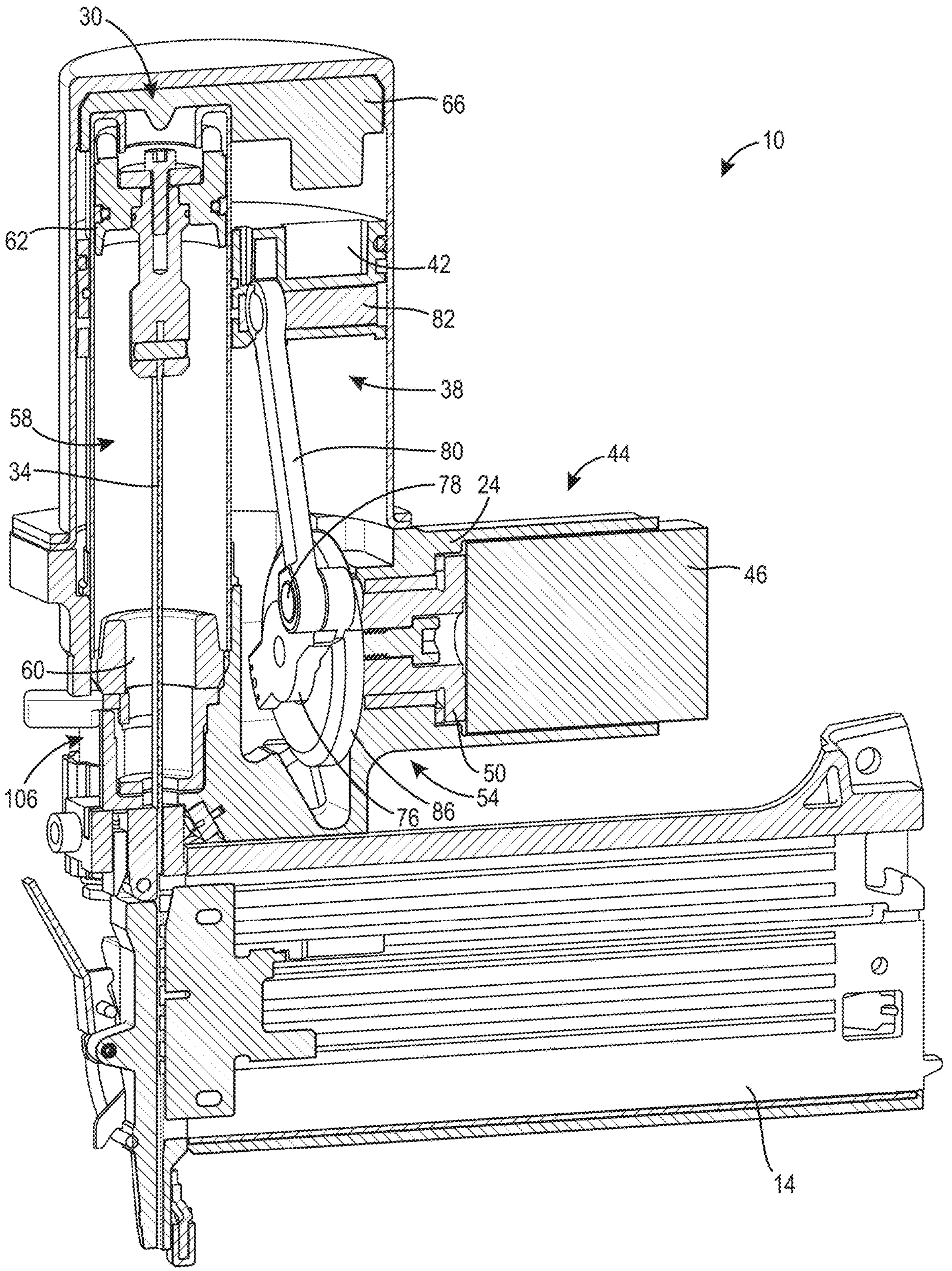
FIG. 2 is a cross-sectional view of a portion of the powered fastener driver of FIG. 1 taken along line 2-2 in FIG. 1, illustrating an onboard compressor.

With reference to FIG. 2, the powered fastener driver 10 includes a drive blade 34 actuated by the on-board air compressor 30 to drive the fasteners into a workpiece. The compressor 30 includes a compressor cylinder 38, a compressor piston 42 in the compressor cylinder 38, and a drive mechanism 44 that imparts reciprocating motion to the compressor piston 42 to execute one or more consecutive fastener driving cycles. The drive mechanism 44 includes a motor 46 (e.g., a brushed or brushless DC motor), a transmission 50 (e.g., a multi-stage planetary transmission), and a crank arm assembly 54 that converts a rotational output of the transmission 50 to a reciprocating input to the compressor piston 42. The fastener driver 10 also includes a drive cylinder 58 and a drive piston 62 slidably disposed in the drive cylinder 58.

The drive piston 62 is movable between a top-dead-center (TDC) position (FIG. 2) and a bottom-dead-center (BDC) position (e.g., when the drive piston 62 is adjacent a stop member 60). Similarly, the compressor piston 42 is moveable between a TDC position (e.g., when the compressor piston 42 is adjacent a cylinder head 66) and a BDC position (e.g., when the compressor piston 42 is adjacent the crank arm assembly 54), or close to a BDC position. The phrase "close to a BDC position" and/or "near BDC" as described herein, refers to a position within about 5% to 25% of reaching an absolute BDC, as the crank arm assembly 54 may rotate less than 360° in some cases. In this way, the compressor position 42 may not fully reach BDC. In the illustrated embodiment, the drive cylinder 58 further includes a stop member 60 (e.g., a resilient bumper) positioned to engage and absorb energy from the drive piston 62 when the drive piston 62 reaches the BDC position.

Figure 5:
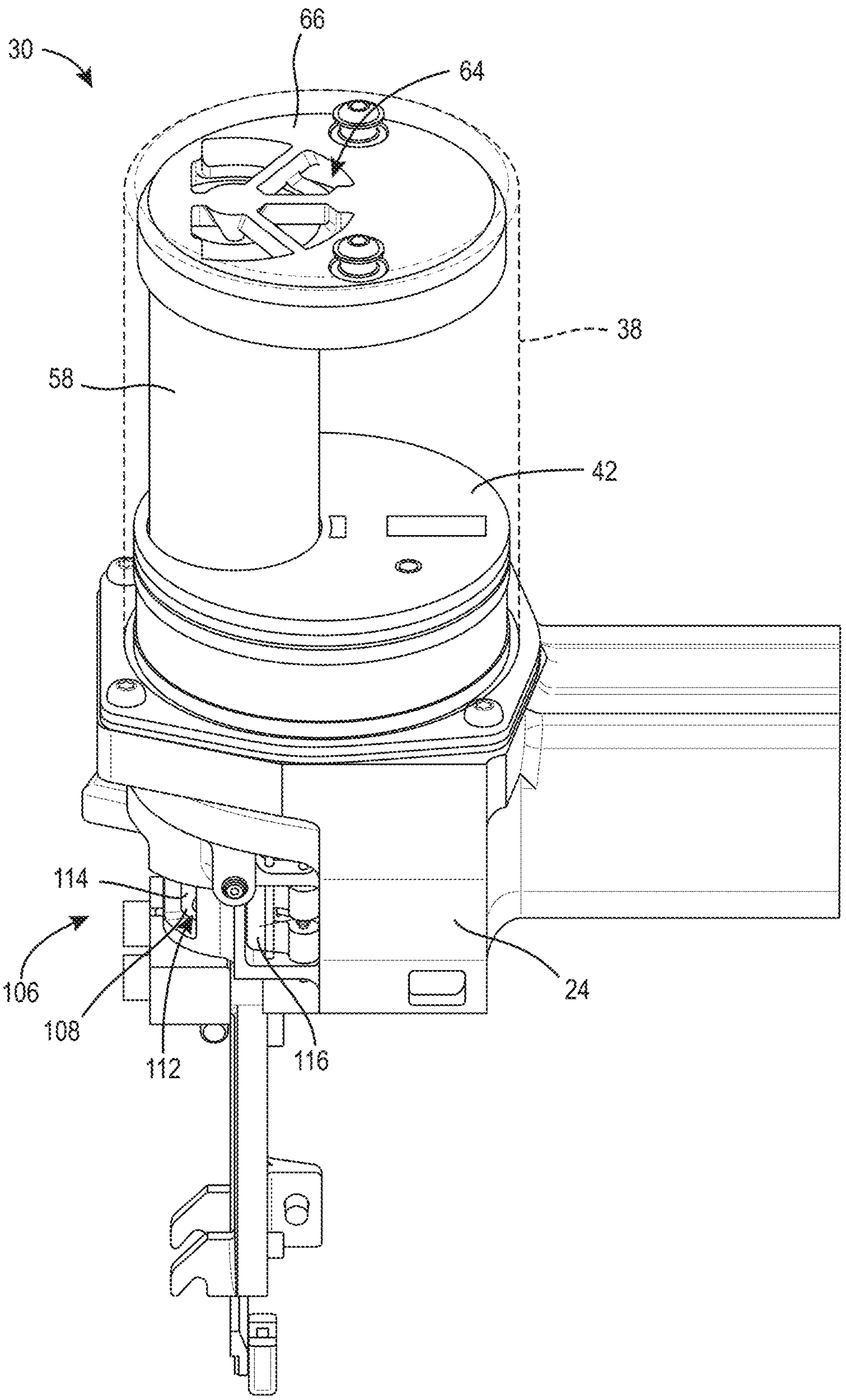
FIG. 5 is a perspective view of a portion of the powered fastener driver of FIG. 1 with a portion of a cylinder removed to illustrate cylinder head forming a passage between a compressor cylinder and a driver cylinder of the onboard compressor.

As shown in FIGS. 2 and 5, the smaller drive cylinder 58 may extend into and/or within the larger compressor cylinder 38 such that the compressor piston 42 may surround the entire drive cylinder 58. By nesting the drive cylinder 58 (e.g., at least partially nested, fully nested, and/or the like) within the compression cylinder 38, the size and/or weight of the fastener driver 10 may be advantageously reduced for improved handling, manufacturability, and/or the like. In this way, the fastener driver 10 may be easier for users to operate, and result in reduced user fatigue. The drive cylinder 58 and the compression cylinder 38 are in fluid communication by way of a passage 64 (see e.g., FIGS. 3 and 5). The passage 64 allows for the transmission of air and, therefore, air pressure between the two cylinders 38, 58. In the illustrated embodiment, a cylinder head 66 is coupled to a distal end (e.g., an upper end) of the compression cylinder 38. The cylinder head 66 may include a plurality of apertures that define the passage 64, which allows for continuous fluid communication between the two cylinders 38, 58. In other words, the passage 64 may be devoid of a valve, in some cases. In some embodiments, the compression cylinder 38 may be in continuous fluid communication such there is no selection or adjustment possible (e.g., the drive cylinder 58 and the compression cylinder 38 are always connected in an unchanging way).

Figure 3:
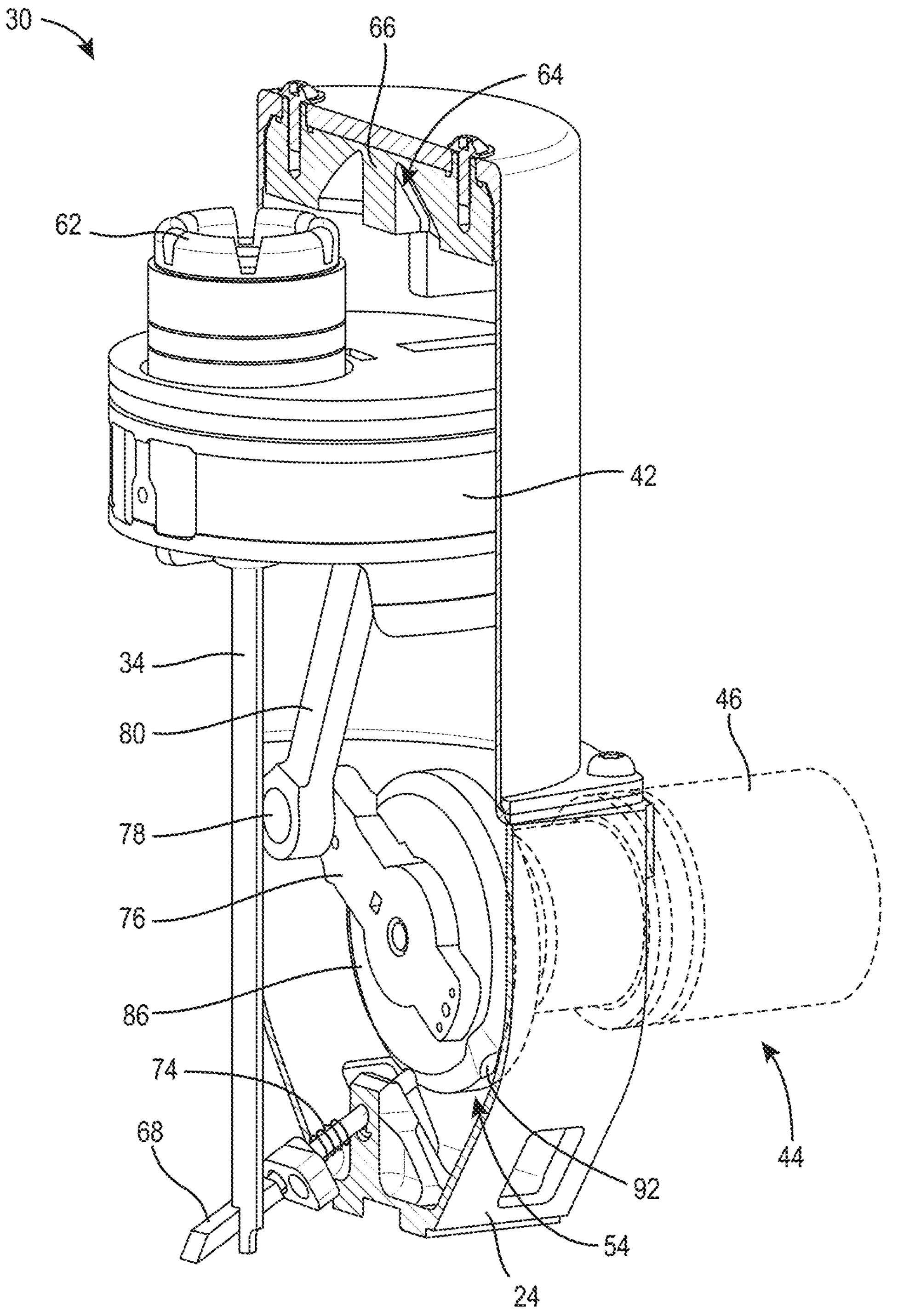
FIG. 3 is a perspective view of a portion of the powered fastener driver of FIG. 1 with a portion of a cylinder removed to illustrate a crank arm assembly and a latch.
Figure 4:
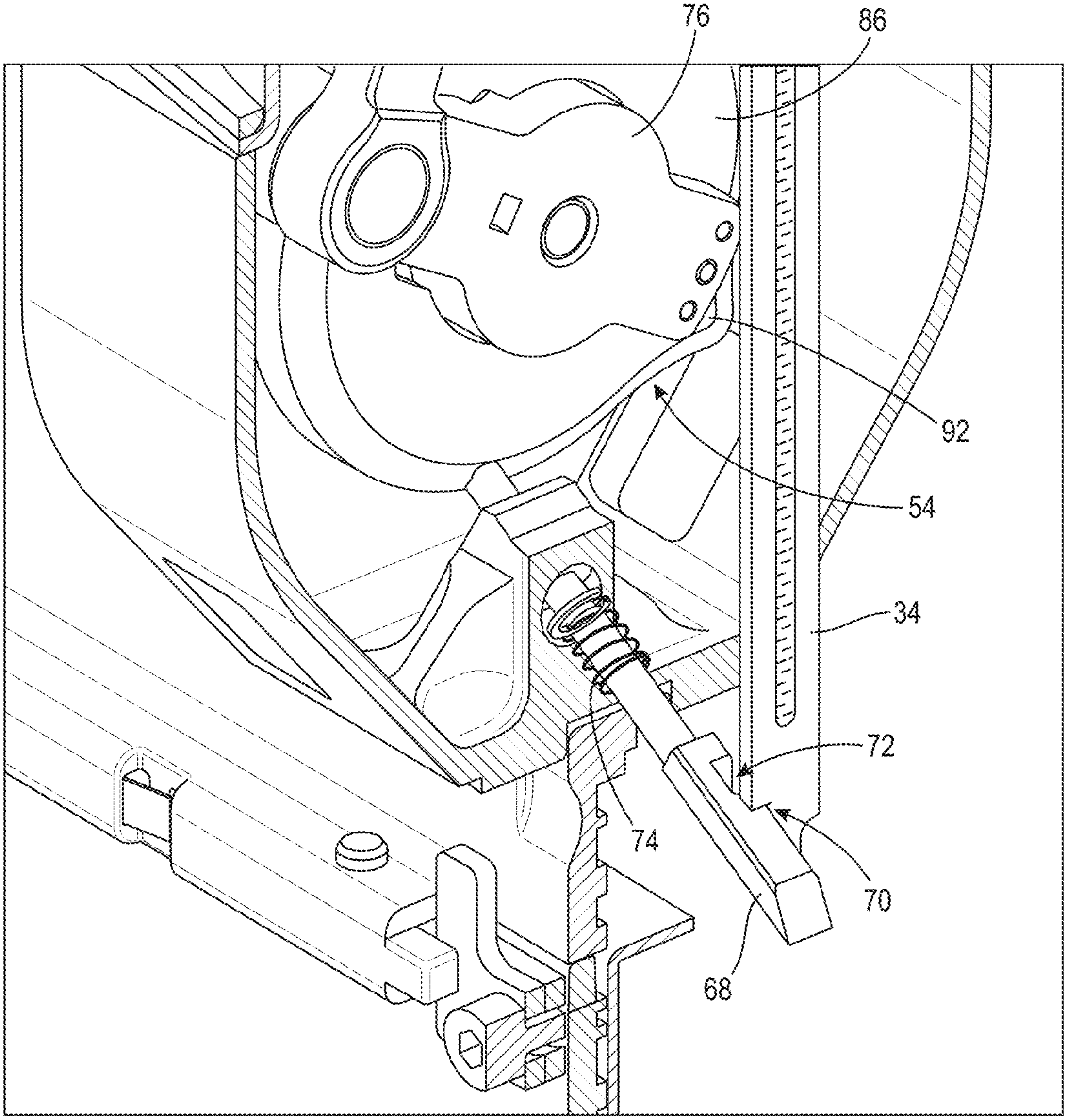
FIG. 4 is an enlarged perspective view of a portion of the powered fastener driver FIG. 3, illustrating the latch in a locked position.

As shown in FIGS. 3 and 4, the powered fastener driver 10 may additionally include a latch 68 supported within the structural housing 24, which extends between the drive mechanism 44 and the drive blade 34. The latch 68 is movable between a locked position, in which the latch 68 engages the drive blade 34 to secure the drive piston 62 in the TDC position, and an unlocked position, in which the latch 68 disengages the drive blade 34 so the drive piston 62 is able to move from the TDC position to the BDC position to perform a fastener driving operation. In the illustrated embodiment, the drive blade 34 includes a slot 70, and a biasing member 74 configured to bias the latch 68 towards the locked position.

The latch 68 may further include a recess 72. When the latch 68 is in the unlocked position, the recess 72 is aligned with the drive blade 34. When the latch 68 is in the locked position, the slot 70 formed in the drive blade 34 is configured to receive a portion of the latch 68 to restrict movement of the drive blade 34. When the crank arm assembly 54 moves the compressor piston 42 towards the TDC position, the crank arm assembly 54 moves the latch 68 from the locked position to the unlocked position, which releases the drive blade 34 and initiates a fastener driving operation.

Figure 6:
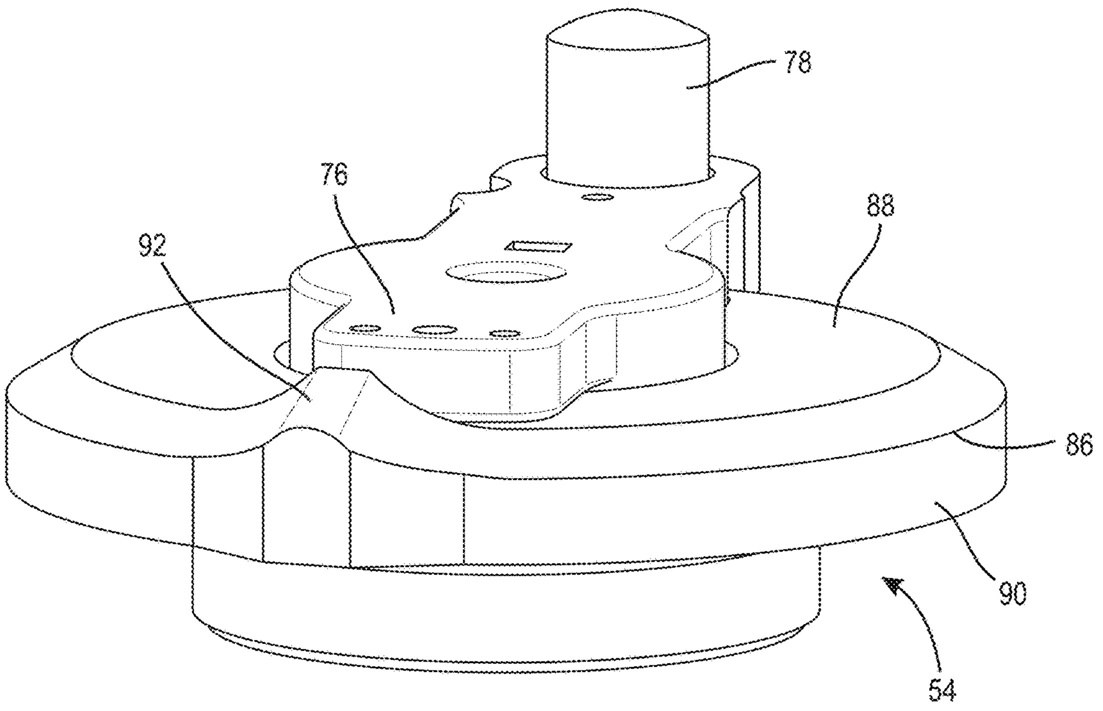
FIG. 6 is a top, perspective view of a portion of the crank arm assembly of the powered fastener driver of FIG. 1, illustrating a cam lobe formed on a cam of the crank arm assembly.
Figure 7:
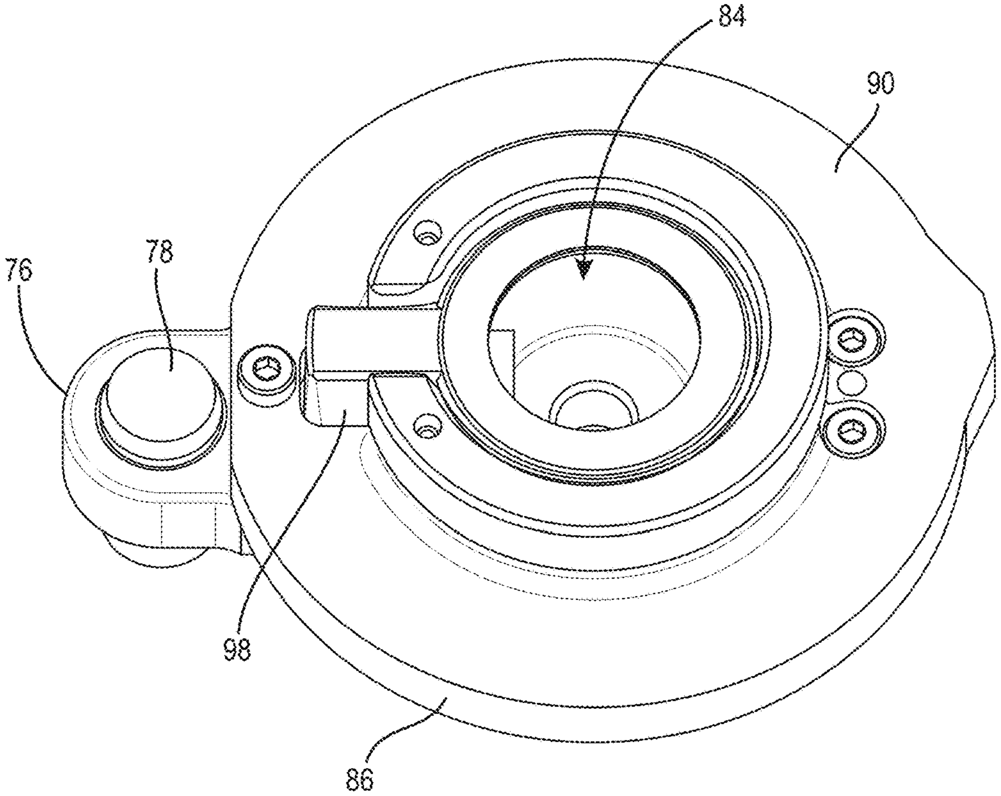
FIG. 7 is a bottom, perspective view of the crank arm assembly of the powered fastener driver of FIG. 1, illustrating a finger and a hub formed on a crank arm of the crank arm assembly.

As shown in FIGS. 3, 4, and 6, the crank arm assembly 54 includes a crank arm 76 with an eccentric pin 78 and a connecting rod 80 pivotably coupled to the pin 78 at one end and a piston pin 82 (FIG. 2) at an opposite end. With reference to FIG. 7, the crank arm 76 includes a hub 84 coupled for co-rotation with an output shaft of the transmission 50 (e.g., by a key and keyway arrangement). With reference to FIG. 6, the crank arm assembly 54 also includes a cam 86 coupled for co-rotation with the crank arm 76. The cam 86 includes a first side 88, a second side 90 opposite the first side 88, and a cam lobe 92 formed on the first side 88. In the illustrated embodiment, the cam lobe 92 is formed as a protrusion on the first side 88 of the cam 86 that extends in an axial direction and parallel with a rotational axis of the crank arm 76 and cam 86. As explained in further detail below, one end of the latch 68 is biased against the first side 88 of the cam 86, resulting in sliding movement between the latch 68 and the cam 86 as the cam 86 rotates. As the latch 68 slides up the cam lobe 92, the latch 68 is moved towards the unlocked position. In this regard, the latch 68 behaves as a follower in response to rotation of the cam 86.

The crank arm assembly 54 is configured such that the crank arm 76 and the cam 86 may be configured to rotate less than 360° to execute a complete fastener driving cycle. It should be appreciated that a complete fastener driving cycle may be defined as the compressor piston 42 starting at a position near the BDC position, moving to the TDC position, and finishing at a position near the BDC position, while the drive piston 62 starts at TDC position, moves to the BDC position when the compressor piston 42 reaches the TDC position, and finishes in the TDC position. For the compressor piston 42 to execute the complete fastener driving cycle, the crank arm assembly 54 rotates less than 360°.

To initiate a subsequent compete fastener driving cycle, the rotation of the crank arm assembly 54 is reversed by the motor 46. In the illustrated embodiment, the crank arm 76 and cam 86 rotate approximately 292° during a complete fastener driving cycle. In other embodiments, the crank arm 76 and cam 86 may rotate in a range from 250° to 350°. To accomplish this, the motor 46 rotates the crank arm 76 and cam 86 alternately in a clockwise and a counterclockwise manner (e.g., clockwise then counterclockwise) to complete consecutive fastener driving cycles.

Figure 8:
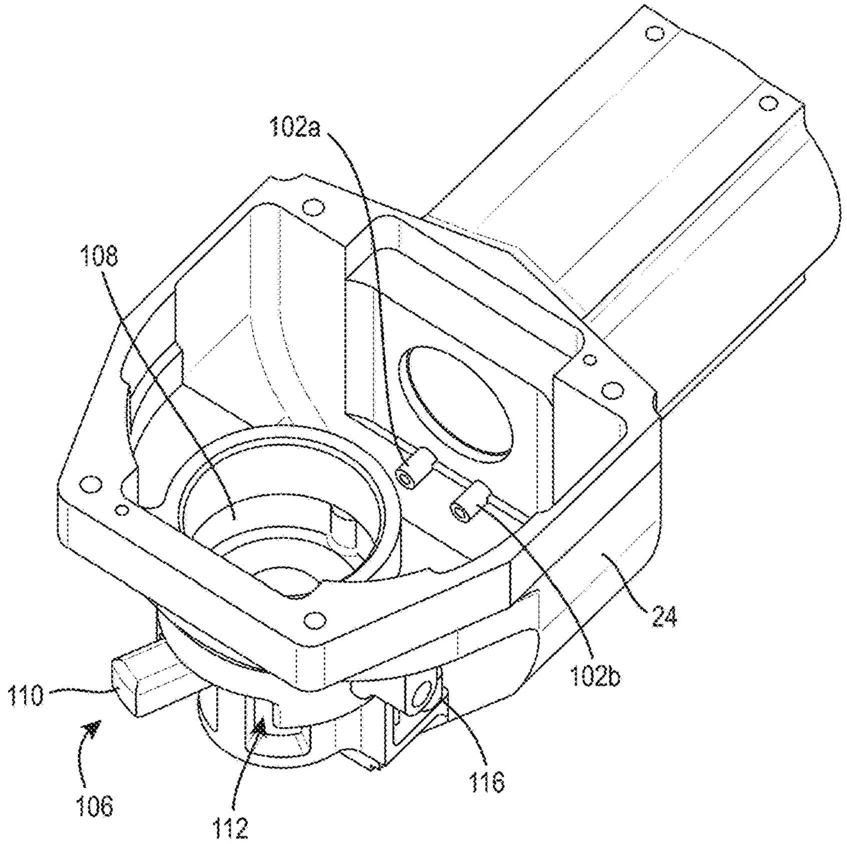
FIG. 8 is a top, perspective view of a structural housing of the powered fastener driver of FIG. 1, illustrating stop pins extending from an interior wall of the structural housing.

Now with reference to FIG. 8, the structural housing 24 includes a pair of fixed stops or stop structures (stop pins 102*a*, 102*b*) extending from an interior wall of the structural housing 24 adjacent the crank arm 76. And, as shown in FIG. 7, the crank arm 76 includes a finger 98 extending radially outward from the hub 84 on the second side 90 of the cam 86. The stop pins 102*a*, 102*b* are positioned such that opposite sides of the finger 98, respectively, can engage the stop pins 102*a*, 102*b* at the start and the end of each fastener driving cycle to form a hard stop. In the illustrated embodiment, the stop pins 102*a*, 102*b* are formed of rigid material (e.g., steel, aluminum, rigid plastic, and/or the like). In other embodiments, the stop pins 102*a*, 102*b* may be formed of a resilient material (e.g., rubber, elastomer, and/or the like). In the illustrated embodiment, the stop pins 102*a*, 102*b* and the width of the finger 98 define the angular range through which the crank arm 76 is able to rotate, as described above.

As shown in FIGS. 8-10B, the fastener driver 10 includes a back-pressure adjustment mechanism 106 supported within the structural housing 24. The back-pressure adjustment mechanism 106 is configured to vary the amount of air exhausted from the drive cylinder 58 beneath the drive piston 62 (i.e., on a side of the drive piston 62 opposite the cylinder head 66) during a fastener driving cycle. Because the fastener driver 10 may not include any pressure valves, the pressure of compressed air developed within the compressor cylinder 38 is the same and at a maximum value for each fastener driving cycle.

As such, the back-pressure adjustment mechanism 106 can selectively increase or decrease the amount of air exhausted from the drive cylinder 58 beneath the drive piston 62 as the drive piston 62 moves from the TDC position to the BDC position, thus either reducing or increasing, respectively, the back pressure acting on the drive piston 62 during a fastener driving cycle. In this way, the force acting on the drive piston 62 may be increased or decreased for driving different sizes of fasteners (e.g., 16 gauge nails, 18 gauge nails, 1 inch, 2 inch, and/or the like) to appropriate distances within a workpiece to make the fastener driver 10 suitable for use in a variety of different fastening applications.

The back-pressure adjustment mechanism 106 may include a basket 108 rotatably supported within the structural housing 24, an adjustment member 110 extending from the basket 108 through the structural housing 24, and an opening 112 formed in the basket 108 to expose a central bore within the basket 108. The opening 112 in the basket 108 selectively aligns with a window 114 formed in the structural housing 24 which, in turn, is in fluid communication with the external atmosphere. Rotation of the basket 108 (e.g., via the adjustment member 110), adjusts the positioning of the opening 112 relative to the window 114, and thus the effective cross-sectional area of the opening 112 that is exposed to the atmosphere.

Adjusting the size of the exposed opening 112, therefore, adjusts the volumetric flow rate of air that is exhausted from the drive cylinder 58 beneath the drive piston 62, through the exposed opening 112 and window 114. For example, reducing the size of the exposed opening 112 reduces the flow rate of air that can be exhausted through the opening 112, which creates a larger back-pressure acting against the drive piston 62 and thus reduces the net force acting on the drive piston 62 during a fastener driving cycle. Increasing the size of the exposed opening 112 increases the amount of air that can be exhausted through the opening 112, which creates a smaller back-pressure acting against the drive piston 62 and thus increases the net force acting on the drive piston 62 during a fastener driving cycle.

Figure 9:
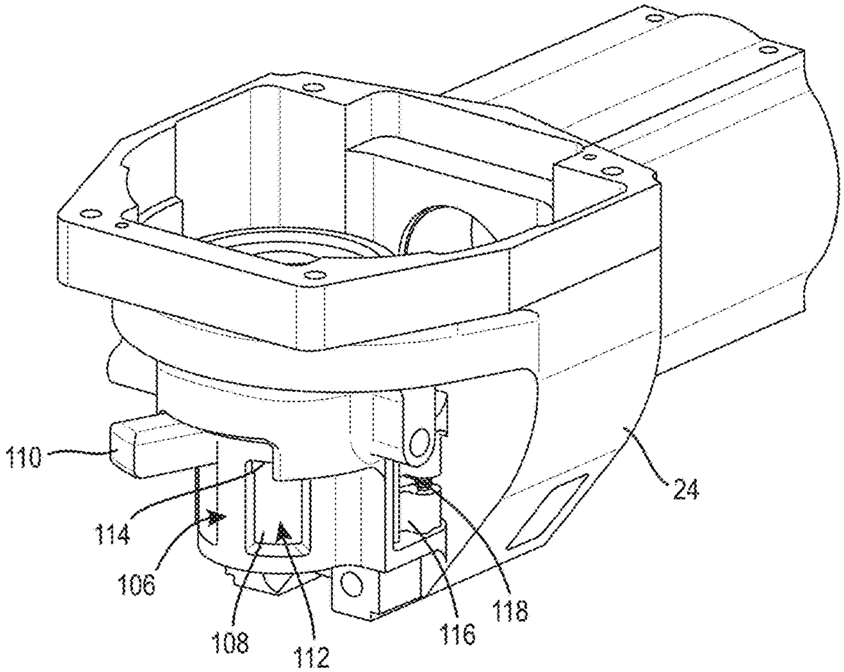
FIG. 9 is a perspective view of the structural housing of the powered fastener driver of FIG. 1, illustrating a back-pressure adjustment mechanism and a check door.
Figure 10A:
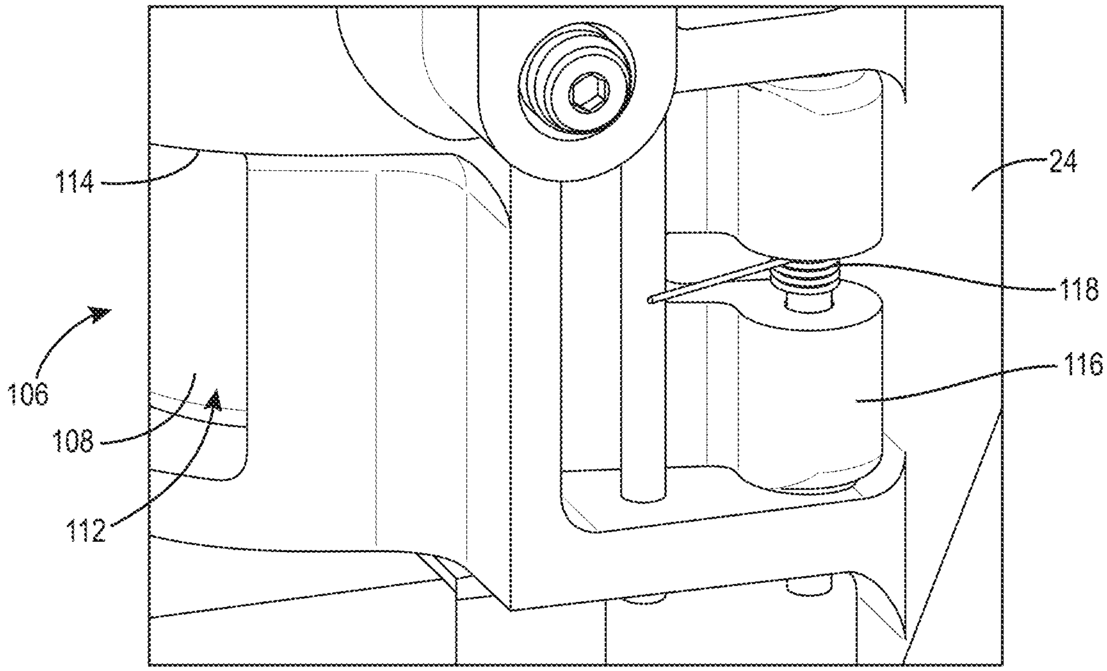
FIG. 10A is a partial perspective view of the structural housing of the powered fastener driver of FIG. 1, illustrating the check door in a closed position.
Figure 10B:
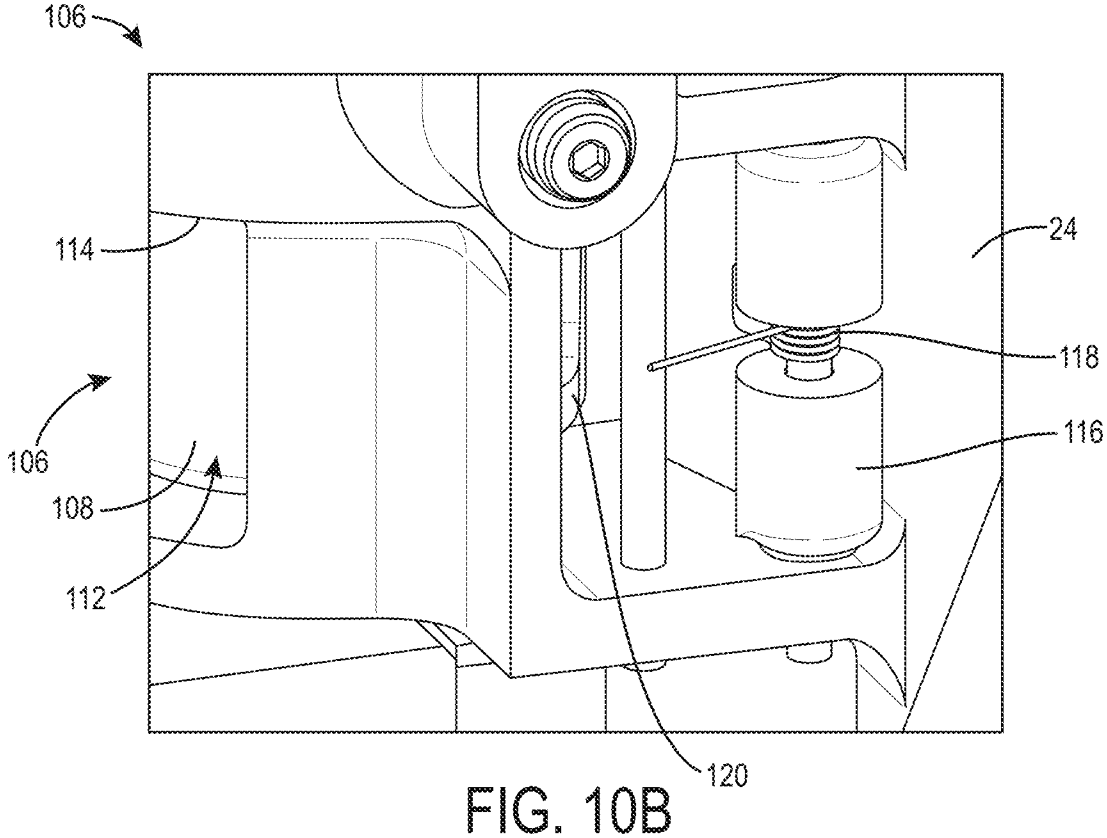
FIG. 10B is a partial perspective view of the structural housing of the powered fastener driver of FIG. 1, illustrating the check door in an open position.

With continued reference to FIGS. 9, 10A, and 10B, fastener driver 10 also includes a check door 116 and a biasing member 118 (e.g., a torsion spring) that biases the check door 116 towards a closed position (FIG. 10A), which blocks the flow rate of air through a second window 120 (FIG. 10B) of the basket 108. In the closed position, the second window 120 is closed and atmospheric air is prevented from exiting the drive cylinder 58 via the basket 108 in response to the drive piston 62 moving from the TDC position toward the BDC position. The check door 116 is positioned adjacent the back-pressure adjustment mechanism 106 and is movable to an open position where the second window 120 in the basket 108 is opened to permit atmospheric air to enter the drive cylinder 58 via the basket 108 in response to the drive piston 62 moving from the BDC position toward the TDC position. More specifically, during the movement of the drive piston 62 from the BDC position toward the TDC position, a vacuum is created within the drive cylinder 58 beneath the drive piston 62 that pulls the check door 116 to the open position.

When the check door 116 is in the open position, the entire opening 112 of the basket 108 may be exposed to the atmosphere (via the first and second windows 114, 120 in the structural housing 24) so replacement air may enter the drive cylinder 58 beneath the drive piston 62. Once the drive piston 62 is returned the TDC position, the vacuum acting on the check door 116 to hold the check door 116 in the open position dissipates, permitting the spring 118 to rebound and return the check door 116 to its closed position, thereby closing the second window 120, and resetting the driver 10 for a subsequent fastener driving cycle. As the drive piston 62 and the drive blade 34 return to the TDC position, the biasing member 74 also urges the latch 68 into engagement with the slot 70 of the drive blade 34, which locks the drive blade 34 in a position for the subsequent fastener driving cycle.

At the beginning of a fastener driving cycle, the latch 68 maintains the drive piston 62 in the TDC position, while the compressor piston 42 is in the BDC position. One side of the finger 98 on the crank arm 76 is engaged with, for example, the stop pin 102*a*. When the operator actuates the trigger 26, the motor 46 is activated to rotate the crank arm 76 in a first rotational direction toward the stop pin 102*a* to confirm that the finger 98 is engaged with the stop pin 102*a*. This ensures the crank arm 76 is in a starting position at the beginning of a fastener driving cycle. The motor 46 is then rotated in an opposite direction to drive the compressor piston 42 upward toward its TDC position by the crank arm assembly 54. As the compressor piston 42 travels upward, the air in the compressor cylinder 38 and above the compressor piston 42 is compressed, while the latch 68 maintains the drive piston 62 in the TDC position.

Once the crank arm 76 and cam 86 reach a predetermined angular position coinciding with the TDC position of the compressor piston 42, the latch 68 is moved into its unlocked position by the cam 86, which releases the drive blade 34 as described above. After the drive blade 34 is released by the latch 68, the drive piston 62 is accelerated downward within the drive cylinder 58 by the compressed air within the compressor cylinder 38, which causes the drive blade 34 to impact a fastener held in the magazine 14 and drive the fastener into a workpiece until the drive piston 62 reaches the stop member 60 located at the BDC position within the drive cylinder 58.

Upon the drive piston 62 reaching its BDC position, one-half of the fastener driving cycle is complete, and the compressor piston 42 is driven downwards towards the BDC position by the motor 46 and crank arm assembly 54 to complete the fastener driving cycle and ready the fastener driver 10 for a subsequent fastener driving cycle. As the compressor piston 42 is driven through a retraction stroke (i.e., from the TDC position toward the BDC position), a vacuum is created within the compressor cylinder 38 and the drive cylinder 58, creating a pressure imbalance on the drive piston 62 and a resultant upward force, causing the drive piston 62 to return to its TDC position. During the movement of the drive piston 62 to the TDC position, the check door 116 opens, which allows replacement air to enter the drive cylinder 58 beneath the drive piston 62 to facilitate return of the drive piston 62 to the TDC position as described above. When the drive piston 62 and the drive blade 34 return to the TDC position, the biasing member 74 urges the latch 68 into the slot 70 of the drive blade 34, which locks the drive blade 34 in position for the subsequent fastener driving cycle.

In the illustrated embodiment, the rotational speed of the motor 46 is decreased after the fastener driving operation occurs such that the opposite side of the finger 98 engages the stop pin 102*a*, 102*b* at a low enough speed to prevent shearing of the stop pin 102*a*, 102*b*. The construction of the crank arm assembly 54 allows a control system 300, described in more detail below, to initiate a timer-based control of the motor 46, which permits the fastener driver 10 to be sensorless. In other words, the fastener driver 10 does not use any position sensors to detect the position of the compressor piston 42 or the drive piston 62. Rather, for the compressor piston 42 to execute the complete fastener driving cycle, the crank arm assembly 54 rotates less than 360° (e.g., 292° in the illustrated embodiment).

To complete consecutive fastener driving cycles, the motor 46 rotates the crank arm 76 and cam 86 alternately in a clockwise and a counterclockwise manner (e.g., clockwise then counterclockwise). For example, a timer may be used to set a timer duration for the complete fastener driving operation. The control system 300 brakes the motor 46 at a first time (e.g., to prevent shearing of the stop pin 102*a*, 102*b*), the finger 98 of the crank arm 76 engages the stop pin 102*a*, 102*b* at a second time, and after the crank arm 76 is stopped by the stop pin 102*a*, 102*b*, the motor 46 is stalled (e.g., still receives power but does not rotate) until a remainder of the timer duration is reached (e.g., a third time is reached). As such, this ensures the crank arm assembly 54 is positioned adjacent the stop pin 102*a*, 102*b*.

Figure 11:
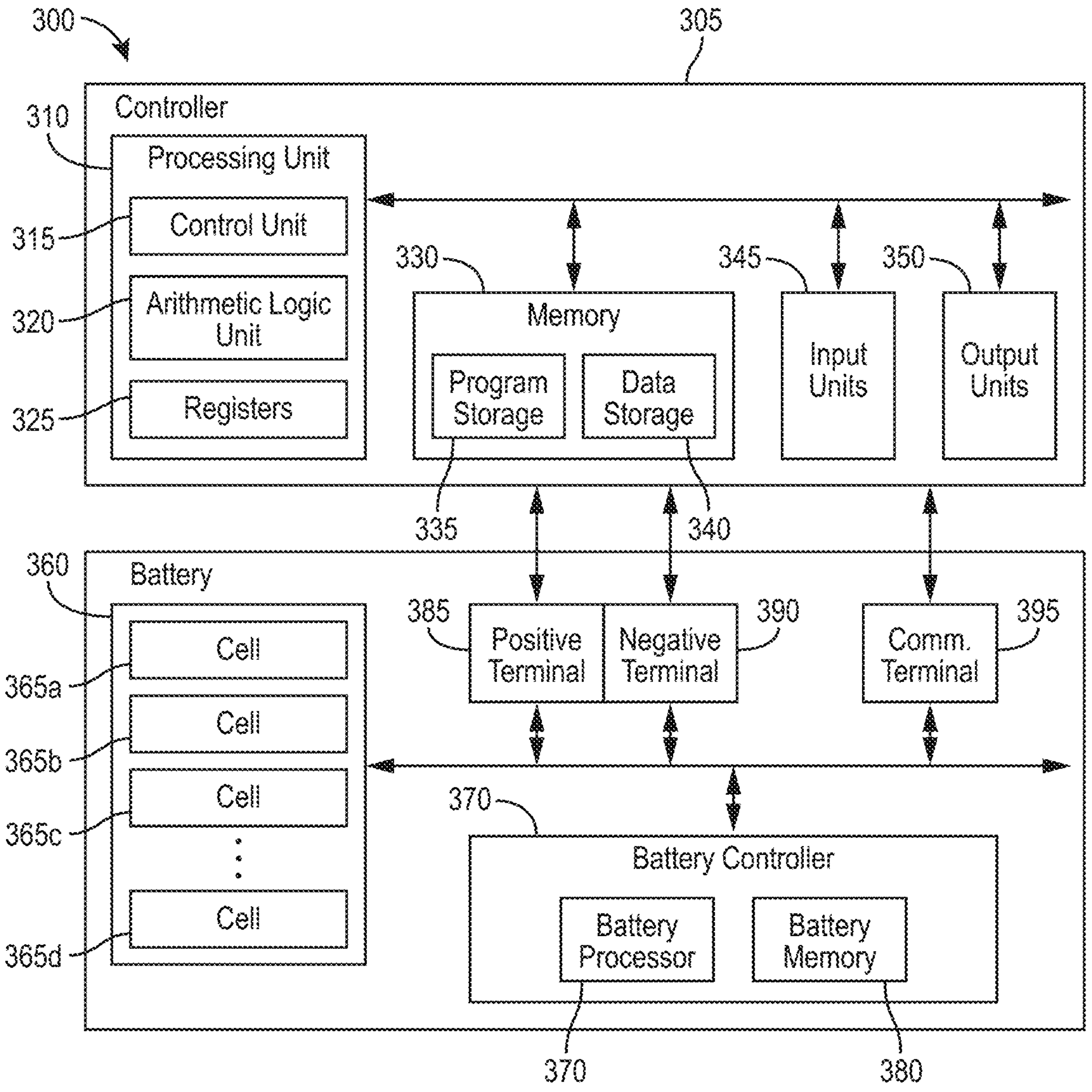
FIG. 11 is a block diagram of a power tool system including a power tool and a battery pack according to embodiments described herein.

FIG. 11 is a block diagram of a control system 300 of the powered fastener driver 10. In other embodiments, the control system 300 may be used with other power tools. The control system 300 may include a controller 305, as well as other components not pictured in FIG. 11, for example a motor 46, a solenoid, or other mechanical and/or electrical components described above. The controller 305 may include a processing unit 310 comprising a control unit 315, an arithmetic logic unit 320, and one or more registers 325. The controller 305 may further include a memory 330 consisting of program storage 335 and/or data storage 340. The memory 330 may be flash memory, random access memory, solid state memory, another type of memory, or a combination of these types. The controller 305 may further include one or more input units 345 and/or output units 350

The battery pack 355 may include a stack 360 consisting of one or more battery cells 365. In some embodiments, the one or more battery cells 365 are electrically connected to each other in a series-type manner. In other embodiments, the one or more battery cells 365 are electrically connected to each other in a parallel-type manner. In still other embodiments, the one or more battery cells 365 are electrically connected to each other in a combination of a series-type and a parallel-type manner. The battery pack 355 may further include a battery controller 370 consisting of a battery processor 375 and a battery memory 380. The battery pack 355 may further include a positive battery terminal 385 and a negative battery terminal 390. The positive battery terminal 385 and the negative battery terminal 390 may be configured to electrically and/or mechanically couple to corresponding terminals of the powered fastener driver 10. In some embodiments, the battery pack 355 includes a communication terminal 395, which may be configured to electrically, mechanically, and/or communicatively couple to one or more communication terminals of the powered fastener driver 10.

In some embodiments, such as the block diagram of FIG. 11, the one or more battery cells 365 are connected to the battery controller 370. The battery controller 370 controls the power delivered to the positive battery terminal 385 and the negative battery terminal 390 (for example, via control of a discharge field-effect transistor (FET), a charge FET, and/or other FETs located within the battery pack). In some embodiments, the battery pack controller 370 controls the power by allowing or prohibiting power. Additionally, in some embodiments, the battery pack controller 370 controls the power by allowing a percentage of power generated by the one or more battery cells 365 to be output. In some embodiments, the amount of power delivered between the battery terminals 385, 390 is approximately 100% of power possibly generated by the one or more battery cells 365.

Figure 12:
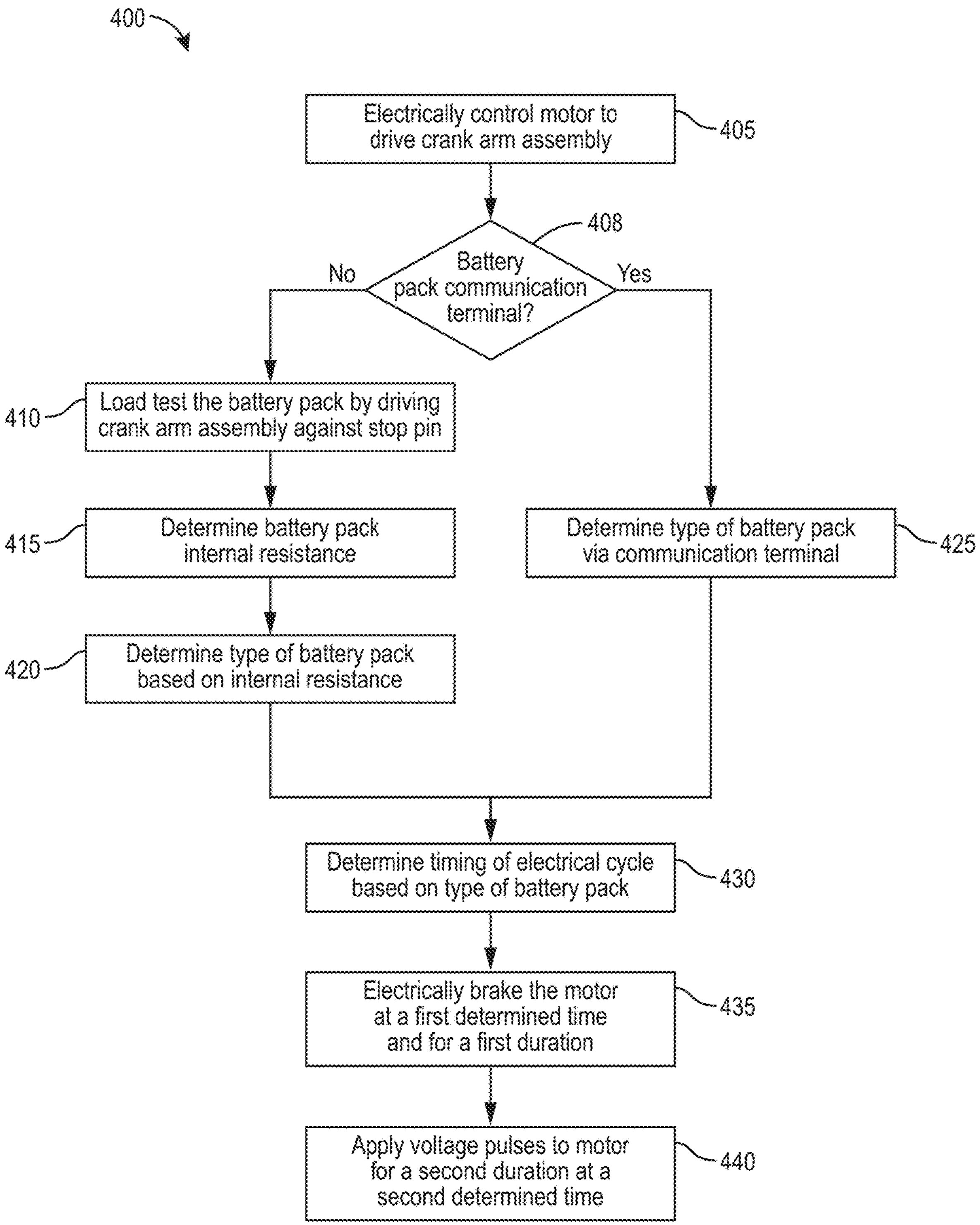
FIG. 12 is a flow chart of a method for controlling the motor of a power tool according to embodiments described herein.

FIG. 12 is a flowchart illustrating a method 400 for controlling a motor (e.g., the motor 46) of a power tool (e.g., the powered fastener driver 10), according to some embodiments. It should be understood that the order of the steps disclosed in the method 400 could vary. For example, additional steps may be added to the process and not all of the steps may be required, or steps shown in one order may occur in a second order. Upon receiving a signal to begin an operation of the power tool, the method 400 begins. The method 400 includes electrically controlling, by the controller 305, the motor 46 to drive the crank arm assembly 54 (BLOCK 405). In some embodiments, the motor 46 drives the crank arm assembly 54 in a first direction. In some embodiments, the controller 305 may execute BLOCK 405 following BLOCK 408.

The method 400 further includes determining, by the controller 305, whether a battery pack electrically, mechanically, and/or communicatively coupled to the power tool includes a communication terminal (BLOCK 408). If the controller 305 determines that the battery pack does not include a communication terminal, the controller 305 additionally includes load testing the battery pack by driving the crank arm assembly 54 against a stop pin 102*a*, 102*b* (BLOCK 410). The method 400 further includes determining, by the controller 305 an internal resistance of the battery pack (BLOCK 415). The controller 305 may determine the internal resistance by measuring a voltage and/or a current of the battery pack while driving the crank arm assembly 54 against the stop pin 102*a*, 102*b*. The method 400 then includes determining, by the controller 305, a type of battery pack based on the determined internal resistance (BLOCK 420). If the controller 305 determines that the battery pack does include a communication terminal (in BLOCK 410, the method 400 includes determining, by the controller 305, a type of battery pack by receiving a signal from the battery pack communication terminal (BLOCK 425).

Once the type of the battery pack has been determined by either method (e.g., a first method (BLOCKS 410, 415, and 420) or a second method (BLOCK 425)) presented above, the method 400 includes determining, by the controller 305, a timing of one electrical cycle of the motor 46 (coinciding with one fastener driving cycle of the fastener driver 10) based on the determined type of the battery pack (BLOCK 430). The one electrical cycle may be the time between when the motor 46 begins driving the crank arm assembly 54 from a starting position to when the crank arm assembly 54 hits one of the stop pins 102*a*, 102*b*. Based on the timing of the electrical cycle, the method 400 determines a first time and a second time.

The method 400 further includes electrically braking, by the controller 305, the motor 46 at the determined first time and a first duration (BLOCK 435). Electrically braking the motor 46 may include electrically shorting the lead wires of the motor 46 together for the determined duration. The method 400 further includes applying a series of voltage pulses, by the controller 305, to the motor 46 for a second duration starting at the determined second time (BLOCK 440).

For example, the voltage pulses may correspond to a duty cycle of a pulse-width modulated (PWM) signal. The braking of the motor 46 (at the first time and for the first duration) and the applying of the PWM signal (at the second time and for a portion of the second duration) may occur before the crank arm assembly 54 reaches one of the stop pins 102*a*, 102*b*. In the illustrated embodiment, the PWM signal is continuously applied to the motor 46 after the crank arm assembly 54 engages the stop pin 102*a*, 102*b*, which causes the motor 46 to stall. For example, the second duration where the PWM signal is applied to the motor 46 includes a time both prior to and after the crank arm assembly 54 engages the stop pin 102*a*, 102*b*. As a result, the crank arm assembly 54 is positioned adjacent the stop pin 102*a*, 102*b* for each fastener driving cycle.

In some embodiments, the controller 305 causes the motor 46 to drive the crank arm assembly 54 in a first direction in a first electrical cycle of the motor 46, wherein one electrical cycle is the time between when the motor 46 begins driving the crank arm assembly 54 from a starting position to when the crank arm assembly 54 hits one of the stop pins 102*a*, 102*b*. The controller 305 may then cause the motor 46 to drive the crank arm assembly 54 in a second direction, opposite the first direction, in a second electrical cycle of the motor 46. The motor 46 may alternatively drive the crank arm assembly 54 in this fashion in alternative cycles. For example, in the first, third, fifth, and so-on cycles, the motor 46 may drive the crank arm assembly 54 in a clockwise direction, while in the second, fourth, sixth, and so-on cycles, the motor 46 may drive the crank arm assembly 54 in a counterclockwise direction, or vice versa.

In some embodiments, the signal to begin the first electrical cycle of the motor 46 may be based on an actuation of a trigger 26 or another switch of the power tool. The controller 305 may wait to begin the second electrical cycle until a second actuation of the trigger 26 or other switch occurs. In other embodiments, the controller 305 may begin the first electrical cycle in response to an actuation of a trigger 26 or another switch of the power tool. The controller 305 may begin the second electrical cycle once the first cycle has completed and while the trigger 26 or other switch remains actuated.

Figure 13A:
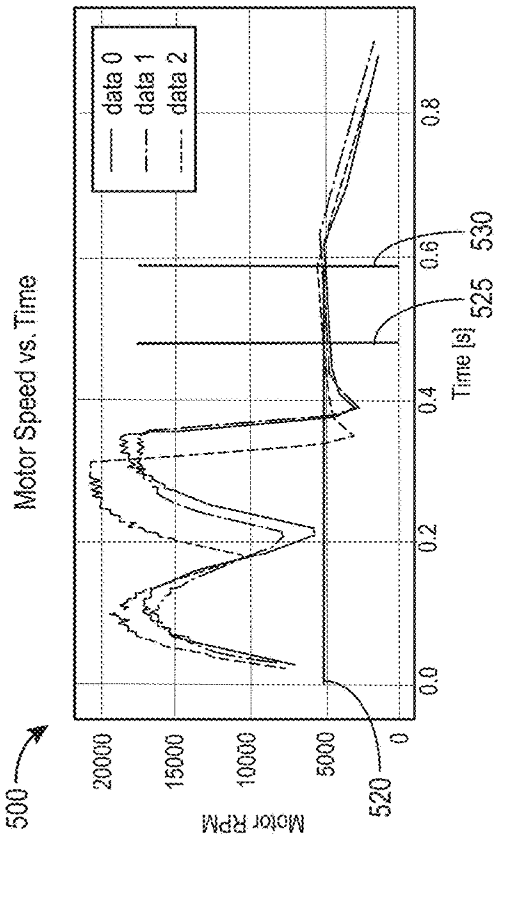
FIG. 13A is a graph of the speed of the motor versus time, according to embodiments described herein.

FIG. 13A is a graph 500 of the speed of the motor 46 versus the time of motor operation according to some embodiments. The X-axis represents the time of motor operation in seconds, while the Y-axis represents speed of the motor 46 in RPM. The graph 500 shows the speed of the motor 46 for three different battery types (denoted in the key of the graph 500 as data 0, data 1, and data 2). The graph 500 includes a horizontal line 520 representing a target speed of the motor 46 before the crank arm assembly 54 hits one of the stop pins 102*a*, 102*b*. The time at which the crank arm assembly 54 will hit one of the stop pins 102*a*, 102*b* is represented on the graph 500 by a first vertical line 525 (for data 2) or a second vertical line 530 (for data 0 and data 1).

Figure 13B:
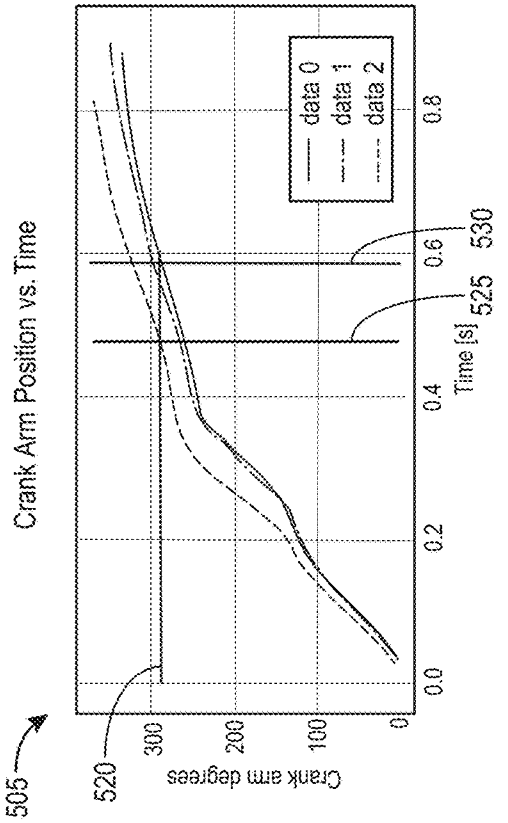
FIG. 13B is a graph of the position of a crank arm versus time of motor operation, according to embodiments described herein.

FIG. 13B is a graph 505 of the position of the crank arm 76 versus the time of motor operation according to some embodiments. The X-axis represents the time of motor operation in seconds, while the Y-axis represents the crank arm 76 position in degrees)(°. The graph 505 shows the crank arm 76 position for three different battery types (denoted in the key of the graph 505 as data 0, data 1, and data 2). The graph 505 includes a horizontal line 520 representing a target angle of the crank arm assembly 54 before the crank arm assembly 54 hits one of the stop pins 102*a*, 102*b*. The time at which the crank arm assembly 54 will hit one of the stop pins 102*a*, 102*b* is represented on the graph 505 by a first vertical line 525 (for data 2) or a second vertical line 530 (for data 0 and data 1).

Figure 13C:
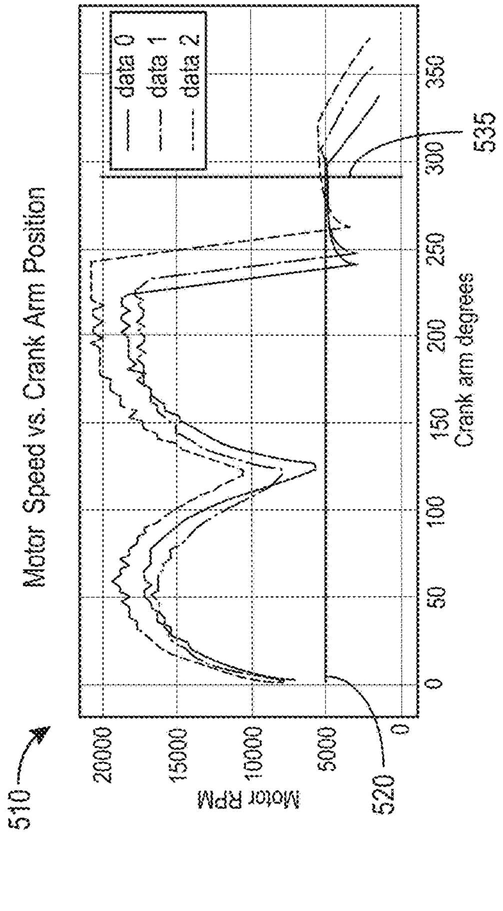
FIG. 13C is a graph of the speed of the motor speed versus the position of the crank arm, according to embodiments described herein.

FIG. 13C is a graph 510 of the speed of the motor 46 versus the position of the crank arm 76 according to some embodiments. The X-axis represents the crank arm 76 position in °, while the Y-axis represents speed of the motor 46 in RPM. The graph 510 shows the speed of the motor 46 for three different battery types (denoted in the key of the graph 510 as data 0, data 1, and data 2). The graph 510 includes a horizontal line 520 representing a target speed of the motor 46 before the crank arm assembly 54 hits one of the stop pins 102*a*, 102*b*. The crank arm 76 position at which the crank arm assembly 54 will hit one of the stop pins 102*a*, 102*b* is represented on the graph 510 by a vertical line 535.

Figure 13D:
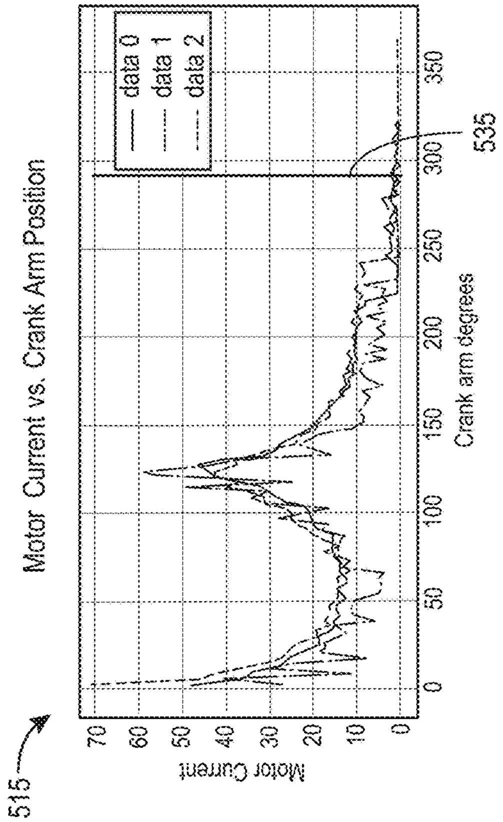
FIG. 13D is a graph of the current of the motor versus the position of the crank arm, according to embodiments described herein.

FIG. 13D is a graph 515 of the current of the motor 46 versus the position of a crank arm 76 according to some embodiments. The X-axis represents the crank arm 76 position in °, while the Y-axis represents the current of the motor 46 in amps. The graph 515 shows the current of the motor 46 for three different battery types (denoted in the key of the graph 515 as data 0, data 1, and data 2). The crank arm 76 position at which the crank arm assembly 54 will hit one of the stop pins 102*a*, 102*b* is represented on the graph 515 by a vertical line 535. A power tool according to embodiments described herein may use these graphs to determine a type of a battery pack electrically, mechanically, and/or communicatively coupled to the power tool, and therefore, the timing of one electrical cycle of the motor 46.

Although the present subject matter has been described in detail with reference to certain preferred embodiments, variations and modifications exist within the scope of one or more independent aspects of the present subject matter as described.

A powered fastener driver comprising: a first cylinder; a first piston positioned within the first cylinder, the first piston being moveable between a top-dead-center position and at or near a bottom-dead-center position; a second cylinder in fluid communication with the first cylinder; a second piston positioned within the second cylinder, the second piston being moveable between a top-dead-center position and a bottom-dead-center position to initiate a fastener driving cycle; a drive blade coupled to the second piston for movement therewith; and a drive mechanism configured to drive the first piston between the top-dead-center position and at or near the bottom-dead-center position, the drive mechanism including a crank arm configured to rotate less than 360 degrees)(° for moving the first piston from at or near the bottom-dead-center position and the top-dead-center position and then back to at or near the bottom-dead-center position to complete the fastener driving cycle.

The powered fastener driver, further comprising a latch extending between the drive mechanism and the drive blade, wherein the latch is movable between a locked position, in which the latch engages the drive blade to secure the second piston in the top-dead-center position, and an unlocked position, in which the latch disengages the drive blade so the second piston is able to move between the top-dead-center position to the bottom-dead-center position.

The powered fastener driver, further comprising a biasing member configured to bias the latch towards the locked position, wherein the latch includes a recess aligned with the drive blade when the latch is in the unlocked position.

The powered fastener driver, wherein the drive blade includes a slot configured to receive a portion of the latch when the latch is in the locked position.

The powered fastener driver, wherein the drive mechanism includes a cam coupled for co-rotation with the crank arm. The powered fastener driver, wherein the cam includes a lobe configured to engage the latch to move the latch from the locked position toward the unlocked position.

The powered fastener driver, wherein the crank arm includes a stop surface configured to engage a fixed stop on a housing of the powered fastener driver both prior to and following completion of the fastener driving cycle. The powered fastener driver, wherein a rotational speed of the crank arm is reduced before contact with the fixed stop to prevent shearing of the fixed stop.

The powered fastener driver, wherein the second piston is driven from the top-dead-center position to the bottom-dead-center position in response to the movement of the first piston.

The powered fastener driver, further comprising a back-pressure adjustment mechanism in communication with the second cylinder, the back-pressure adjustment mechanism configured to adjust a volumetric flow rate of air exhausted from the second cylinder by the second piston during the fastener driving cycle.

The powered fastener driver, wherein the back-pressure adjustment mechanism includes a basket rotatably supported within a housing of the powered fastener driver, and wherein the basket includes an opening that is selectively aligned with a window formed in the housing to adjust an effective size of the window, and therefore the volumetric flow rate of air exhausted from the second cylinder by the second piston during the fastener driving cycle. The powered fastener driver, further comprising a check door that is movable between an open position, in which a second window in the housing is opened to permit atmospheric air to enter the second cylinder via the basket in response to the second piston moving from the bottom-dead-center position toward the top-dead-center position, and a closed position, in which the second window is closed and atmospheric air is prevented from exiting the second cylinder via the basket in response to the second piston moving from the top-dead-center position toward the bottom-dead-center position.

A powered fastener driver comprising a first cylinder; a first piston positioned within the first cylinder, the first piston being moveable between a top-dead-center position and at or near a bottom-dead-center position; a second cylinder in fluid communication with the first cylinder; a second piston positioned within the second cylinder, the second piston being moveable between a top-dead-center position and a bottom-dead-center position to initiate a fastener driving cycle; a drive blade coupled to the second piston for movement therewith; and a drive mechanism configured to drive the first piston between the top-dead-center position and at or near the bottom-dead-center position, the drive mechanism including a crank arm having a stop surface configured to engage a fixed stop on a housing of the powered fastener driver both prior to and following completion of the fastener driving cycle.

The powered fastener driver, wherein a rotational speed of the crank arm is reduced before contact with the fixed stop to prevent shearing of the fixed stop.

The powered fastener driver, wherein the crank arm rotates in a range from 250° to 350° when moving the first piston from at or near the bottom-dead-center position to the top-dead-center position.

The powered fastener driver, wherein the drive mechanism includes a cam coupled for co-rotation with the crank arm, and wherein the cam includes a finger radially extending from a hub of the cam, which defines the stop surface.

A powered fastener driver comprising a first cylinder; a first piston positioned within the first cylinder, the first piston being moveable between a top-dead-center position and at or near a bottom-dead-center position; a second cylinder in fluid communication with the first cylinder; a second piston positioned within the second cylinder, the second piston being moveable between a top-dead-center position and a bottom-dead-center position to initiate a fastener driving cycle; a drive blade coupled to the second piston for movement therewith; a drive mechanism configured to drive the first piston between the top-dead-center position and at or near the bottom-dead-center position to complete the fastener driving cycle; and a back-pressure adjustment mechanism in communication with the second cylinder, the back-pressure adjustment mechanism configured to adjust a volumetric flow rate of air exhausted from the second cylinder by the second piston during the fastener driving cycle.

The powered fastener driver, wherein the back-pressure adjustment mechanism includes a basket rotatably supported within a housing of the powered fastener driver, and wherein the basket includes an opening that is selectively aligned with a window formed in the housing to adjust an effective size of the window, and therefore the volumetric flow rate of air exhausted from the second cylinder by the second piston during the fastener driving cycle. The powered fastener driver, further comprising a check door that is movable between an open position, in which a second window in the housing is opened to permit atmospheric air to enter the second cylinder via the basket in response to the second piston moving from the bottom-dead-center position toward the top-dead-center position, and a closed position, in which the second window is closed and atmospheric air is prevented from exiting the second cylinder via the basket in response to the second piston moving from the top-dead-center position toward the bottom-dead-center position.

A method for controlling a motor of a power tool, the method comprising electrically braking, by a controller, the motor at a first time; and applying a pulse-width modulated (PWM) signal to the motor, by the controller, at a second time; wherein the second time is determined by: determining, by the controller, a type of a battery pack electrically coupled to the power tool; and determining, by the controller, the second time based on the type of the battery pack.

The method, wherein electrically braking the motor includes electrically connecting a first lead of the motor to a second lead of the motor. The method, wherein a speed of the motor is reduced, by the controller, before a crank arm of the power tool reaches a fixed stop of the power tool.

The method, wherein the type of the battery pack is determined by: load testing the battery pack; and determining, by the controller, an internal resistance of the battery pack based on the load testing. The method, wherein load testing the battery pack includes driving a crank arm of the power tool against a fixed stop of the power tool, and measuring, by the controller, one or both of a voltage and a current of the battery pack.

The method, wherein the type of the battery pack is determined by: receiving a signal via a communication terminal of the battery pack, the signal indicative of the type of the battery pack.

The method, wherein the first time is determined based on the type of the battery pack.

A method for controlling a motor of a powered fastener driver, the method comprising: load testing a battery pack of the powered fastener driver by driving a crank arm against a fixed stop coupled to a housing of the powered fastener driver; determining, by a controller, an internal resistance of the battery pack by measuring one or both of a voltage and a current of the battery pack while driving the crank arm against the fixed stop; and determining, by the controller, a type of battery pack based on the determined internal resistance.

The method, further comprising determining, by the controller, a timing of one electrical cycle of the motor based on the determined type of the battery pack. The method, wherein determining the timing includes electrically braking, by the controller, the motor at a first time, and applying a pulse-width modulated (PWM) signal to the motor, by the controller, at a second time. The method, wherein the second time is determined by: determining, by the controller, a type of the battery pack electrically coupled to the power tool; and determining, by the controller, the second time based on the type of the battery pack.

The method, wherein a speed of the motor is reduced, by the controller, before the crank arm reaches the fixed stop.

Various feature of the invention are set forth in the following claims.

What is claimed is:

1. A powered fastener driver comprising:

a first cylinder;

a first piston positioned within the first cylinder, the first piston being moveable between a top-dead-center position and at or near a bottom-dead-center position;

a second cylinder in fluid communication with the first cylinder;

a second piston positioned within the second cylinder, the second piston being moveable between a top-dead-center position and a bottom-dead-center position to initiate a fastener driving cycle;

a drive blade coupled to the second piston for movement therewith; and a drive mechanism configured to drive the first piston between the top-dead-center position and at or near the bottom-dead-center position, the drive mechanism including a crank arm configured to rotate less than 360 degrees in a first direction to move the first piston from at or near the bottom-dead-center position and the top-dead-center position and then back to at or near the bottom-dead-center position to complete a first fastener driving cycle to drive a fastener into a workpiece, and less than 360 degrees in an opposite, second direction to move the first piston from at or near the bottom-dead-center position and the top-dead-center position and then back to at or near the bottom-dead-center position to complete a subsequent second fastener driving cycle to drive another fastener into the workpiece.

2. The powered fastener driver of claim 1, further comprising a latch extending between the drive mechanism and the drive blade, wherein the latch is movable between a locked position, in which the latch engages the drive blade to secure the second piston in the top-dead-center position, and an unlocked position, in which the latch disengages the drive blade so the second piston is able to move from the top-dead-center position to the bottom-dead-center position.

3. The powered fastener driver of claim 2, further comprising a biasing member configured to bias the latch towards the locked position, wherein the latch includes a recess aligned with the drive blade when the latch is in the unlocked position.

4. The powered fastener driver of claim 3, wherein the drive blade includes a slot configured to receive a portion of the latch when the latch is in the locked position.

5. The powered fastener driver of claim 2, wherein the drive mechanism includes a cam coupled for co-rotation with the crank arm.

6. The powered fastener driver of claim 5, wherein the cam includes a lobe configured to engage the latch to move the latch from the locked position toward the unlocked position.

7. The powered fastener driver of claim 1, wherein the crank arm includes a stop surface configured to engage a fixed stop on a housing of the powered fastener driver both prior to and following completion of the first fastener driving cycle.

8. The powered fastener driver of claim 7, wherein a rotational speed of the crank arm is reduced before contact with the fixed stop to prevent shearing of the fixed stop.

9. The powered fastener driver of claim 1, wherein the second piston is driven from the top-dead-center position to the bottom-dead-center position in response to the movement of the first piston.

10. The powered fastener driver of claim 1, further comprising a back-pressure adjustment mechanism in communication with the second cylinder, wherein the back-pressure adjustment mechanism is configured to adjust a volumetric flow rate of air exhausted from the second cylinder by the second piston during at least one of the first and second fastener driving cycles.

11. A powered fastener driver comprising:

a first cylinder;

a first piston positioned within the first cylinder, the first piston being moveable between a top-dead-center position and at or near a bottom-dead-center position;

a second cylinder in fluid communication with the first cylinder;

a second piston positioned within the second cylinder, the second piston being moveable between a top-dead-center position and a bottom-dead-center position to initiate a fastener driving cycle;

a drive blade coupled to the second piston for movement therewith; and a drive mechanism configured to drive the first piston between the top-dead-center position and at or near the bottom-dead-center position, the drive mechanism including a crank arm configured to rotate in a first direction to complete a first fastener driving cycle to drive a fastener into a workpiece and an opposite, second direction to complete a subsequent second fastener driving cycle to drive another fastener into the workpiece.

12. The powered fastener driver of claim 11, wherein the crank arm is configured rotate less than 360 degrees in both the first direction and the opposite, second direction.

13. The powered fastener driver of claim 11, wherein the drive mechanism includes a cam coupled for co-rotation with the crank arm, the cam includes a lobe configured to engage a latch when the crank arm reaches a predetermined angular position coinciding with the top-dead-center position of the first piston, and the lobe moves the latch to an unlocked position so the second piston is able to move from the top-dead-center position to the bottom-dead-center position.

14. The powered fastener driver of claim 13, wherein the latch extends between the drive mechanism and the drive blade, wherein the latch is movable between a locked position, in which the latch engages the drive blade to secure the second piston in the top-dead-center position, and the unlocked position, in which the latch disengages the drive blade so the second piston is able to move from the top-dead-center position to the bottom-dead-center position.

15. The powered fastener driver of claim 13, wherein the lobe is formed as a protrusion on a first side of the cam and extends in an axial direction that is parallel with a rotational axis of the crank arm.

16. The powered fastener driver of claim 11, wherein the crank arm includes a stop surface configured to engage a fixed stop on a housing of the powered fastener driver prior to the first and second fastener driving cycles.

17. A powered fastener driver comprising:

a first cylinder;

a first piston positioned within the first cylinder, the first piston being moveable between a top-dead-center position and at or near a bottom-dead-center position;

a second cylinder in fluid communication with the first cylinder;

a second piston positioned within the second cylinder, the second piston being moveable between a top-dead-center position and a bottom-dead-center position to initiate a fastener driving cycle;

a drive blade coupled to the second piston for movement therewith; and a drive mechanism configured to drive the first piston between the top-dead-center position and at or near the bottom-dead-center position, the drive mechanism including a crank arm configured to rotate less than 360 degrees in alternating directions to complete consecutive fastener driving cycles to consecutively drive a fastener into a workpiece in each of the alternating directions.

18. The powered fastener driver of claim 17, wherein the drive mechanism includes a cam coupled for co-rotation with the crank arm, the cam includes a lobe configured to engage a latch when the crank arm reaches a predetermined angular position coinciding with the top-dead-center position of the first piston, and the lobe moves the latch to an unlocked position so the second piston is able to move between the top-dead-center position to the bottom-dead-center position.

19. The powered fastener driver of claim 18, wherein the crank arm includes an eccentric pin, and a connecting rod pivotably couples to the eccentric pin to the first piston.

20. The powered fastener driver of claim 19, wherein the lobe extends in a direction parallel to the eccentric pin and is radially spaced from the eccentric pin.

* * * * *